Oct. 9, 1951 E. I. BOGEN 2,570,310
SHIELD FOR ROTARY MIXERS
Filed Jan. 3, 1950
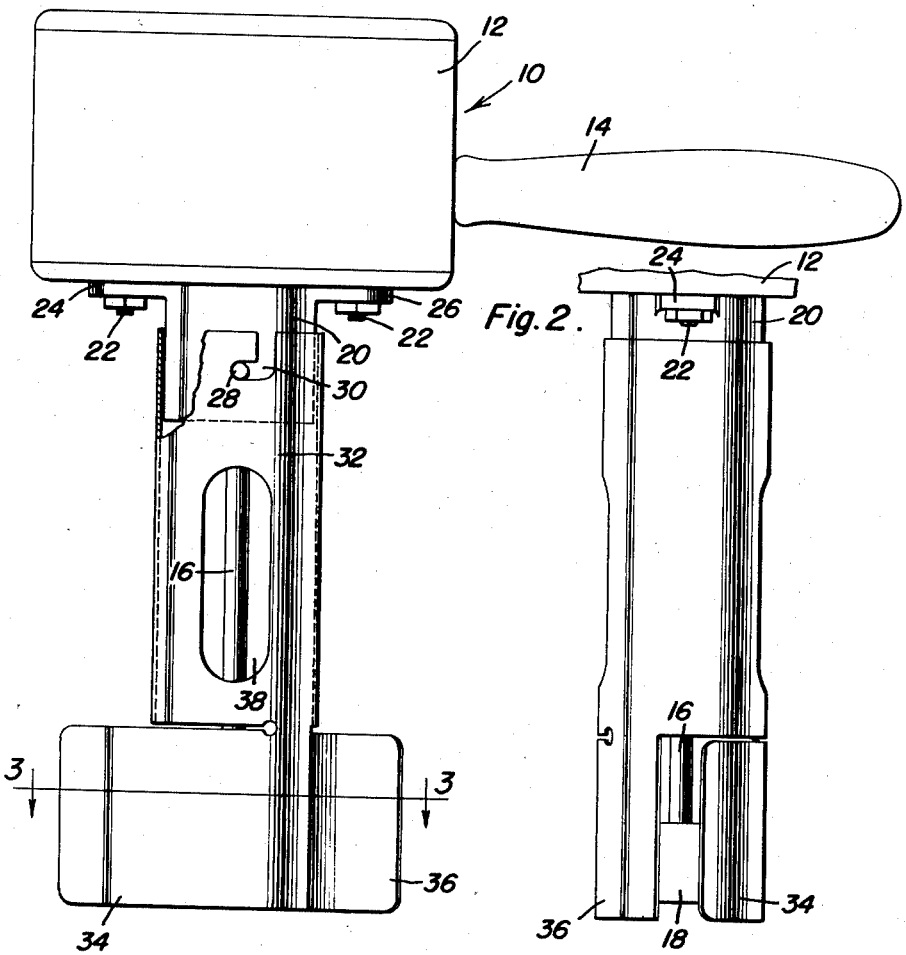
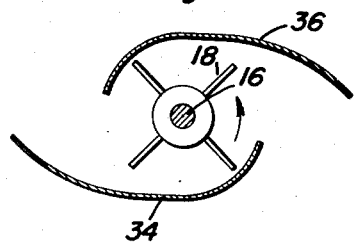
Einar I. Bogen
INVENTOR.
BY Patented Oct. 9, 1951

2,570,310

UNITED STATES PATENT OFFICE 2,570,310

SHIELD FOR ROTARY MIXERS

Einar I. Bogen, Hyde Park, Mass.

Application January 3, 1950, Serial No. 136,505

3 Claims. (Cl. 259—1)

This invention relates to a shield adapted to be removably secured to a rotary mixer.

An object of the invention is to provide a readily detachably mixer shield which will prevent the mixer blades from splashing fluids out of a mixing container.

A further object of the invention is to provide means for shielding the mixer blades from hitting the bottom or the sides of a mixing container.

Yet another object of the invention is to provide a rotary mixer shield that will aid in the mixing operation by forcing fluid into the mixer blades in a regulated manner.

Still further objects of the invention reside in the provision of a mixer shield that is strong, durable, highly efficient in operation, simple in construction and manufacture, capable of being fabricated from any number of readily available materials, capable of being removed for easy washing and cleaning, and relatively inexpensive.

These, together with the various ancillary objects of the invention which will become apparent as the following description proceeds, are attained by this shield for a rotary mixer, a preferred embodiment of which has been illustrated in the accompanying drawings, by way of example only, wherein:

Figure 1 is a side elevational view of the rotary mixer shield shown in operative emplacement on the mixer;

Figure 2 is a front elevational view of the invention as shown in Figure 1; and

Figure 3 is a horizontal sectional view as taken along line 3—3 in Figure 1.

With continuing reference to the accompanying drawings wherein like reference numerals designate similar parts throughout the various views, the numeral 10 is used to designate a conventional household rotary mixer which includes a casing 12 in which a driving unit, not shown, is operatively emplaced, a handle 14, and a shaft 16 on which the mixer blades 18 are adapted to be emplaced.

A tubular adapter element 20 is adapted to be rigidly secured to the casing 12 by means of threaded bolts 22 which engage flanges 24 and 26 integrally formed with the adapter 20. A pin 28 is secured to the adapter 20 adjacent the end opposite the flanges 24 and 26. The pin 28 is engaged within a substantially L-shaped slot 30 opening at one end of a hollow cylindrical shield member 32. While the adapter member 20 is preferably formed from a relatively strong material, the shield 32 is formed from a thinner and lighter material. Integrally secured to the end of the shield member 32 opposed to the slot 30 are guards 34 and 36 which are arcuate in shape and extend downwardly from the shield member 32. The mixer blades 18 are adapted to be encompassed by the guards 34 and 36 which prevent them contacting the edges or bottom of the container in which the mixer is being used. The radii of curvatures of the guard members 34 and 36 are never less than the radii of curvature of the cylindrical member 32. However, the precise shape of the guards 34 and 36 may be varied within certain limits.

A plurality of apertures 38 are formed in the cylindrical side walls of the shield member 32 on opposite sides thereof. These apertures 38 perform the functions of providing windows to determine whether the shaft 16 is rotating, and additionally are used for the passage of fluid when the mixer is being used in a deep container.

As can be readily understood, due to the rotary action of the mixer blades 18 fluid will be sucked into the blades because of the shape of the shields 34 and 36.

Since from the foregoing, the construction and advantages of this shield for a rotary mixer are readily apparent further description is believed to be unnecessary.

However, since numerous modifications will readily occur to those skilled in the art after a consideration of the foregoing specification and accompanying drawing, it is not intended to limit the invention to the exact construction shown and described, but all suitable modifications and equivalents may be resorted to, falling within the scope of the appended claims.

Having described the invention, what is claimed as new is:

1. For use in a shield for a rotary mixer, a shield member having cylindrical side walls, and arcuate guards secured to said cylindrical side walls, the radii of curvature of said guards being greater than the radii of said cylindrical side walls, said arcuate guards being defined by communicating longitudinal and transverse slots in said member, said guards having free ends, said free ends being positioned outwardly of said member substantially parallel with the longitudinal axis of said member.

2. A shield for a rotary mixer comprising a tubular adapter, means formed on one end of said adapter for rigid attachment to said mixer, a pin secured to said adapter adjacent the other end thereof for engagement within a slot opening into one end of a hollow shield member thus forming a bayonet joint, said shield member having cylindrical side walls, and arcuate guards secured to said cylindrical side walls, the radii of curvature of said guard being greater than the radii of said cylindrical side walls, said arcuate guards being defined by communicating longitudinal and transverse slots in said member, said guards having free ends, said free ends being positioned outwardly of said member substantially parallel with the longitudinal axis of said member.

3. A shield member for use in a rotary mixer, said shield member having cylindrical side walls, arcuate guards secured to said cylindrical side walls, and apertures extending through said cylindrical side walls, said arcuate guards being defined by communicating longitudinal and transverse slots in said member, said guards having free ends, said free ends being positioned outwardly of said member substantially parallel with the longitudinal axis of said member.

EINAR I. BOGEN.

REFERENCES CITED

The following references are of record in the file of this patent:

UNITED STATES PATENTS

| Number | Name | Date |
|---|---|---|
| 1,522,230 | Cowles | Jan. 6, 1935 |
| 2,077,445 | Wallace et al. | Apr. 20, 1937 |

FOREIGN PATENTS

| Number | Country | Date |
|---|---|---|
| 283,709 | Germany | Apr. 23, 1915 |
| 382,249 | Germany | Sept. 29, 1923 |